United States Patent [19]

Vaughn, Jr.

[11] Patent Number: 4,474,857

[45] Date of Patent: Oct. 2, 1984

[54] SILICONE RESIN COATING COMPOSITION CONTAINING AN ULTRAVIOLET LIGHT ABSORBING AGENT

[75] Inventor: Howard A. Vaughn, Jr., Schenectady, N.Y.

[73] Assignee: General Electric Company, Waterford, N.Y.

[21] Appl. No.: 568,731

[22] Filed: Jan. 6, 1984

[60] Related U.S. Application Data

Division of Ser. No. 364,302, Apr. 1, 1982, Pat. No. 4,436,851, which is a continuation-in-part of Ser. No. 964,910, Nov. 30, 1978, abandoned.

[51] Int. Cl.$^3$ .................... B32B 9/00; B32B 9/04; B32B 23/16; B32B 27/18
[52] U.S. Cl. .................... 428/446; 428/447; 428/497; 428/532; 428/451
[58] Field of Search ............ 428/447, 497, 446, 532, 428/451

[56] References Cited

U.S. PATENT DOCUMENTS

| | | | |
|---|---|---|---|
| 3,708,225 | 1/1973 | Misch et al. | 428/447 |
| 3,976,497 | 8/1976 | Clark | 428/447 |
| 4,159,206 | 6/1979 | Armbruster et al. | 428/447 |
| 4,177,315 | 12/1979 | Ubergay | 428/447 |
| 4,188,451 | 2/1980 | Humphrey, Jr. | 428/447 |
| 4,369,228 | 1/1983 | Ashby | 428/447 |
| 4,373,080 | 2/1983 | Ching | 428/447 |
| 4,382,109 | 5/1983 | Olson et al. | 428/447 |

FOREIGN PATENT DOCUMENTS 765890  9/1971  Belgium .................... 428/447

Primary Examiner—Allan Lieberman
Attorney, Agent, or Firm—Hedman, Gibson, Costigan & Hoare

[57] ABSTRACT

A silicone resin coating composition is provided which provides a tough, abrasion-resistant coating when applied to a solid substrate. The coating composition has a basic pH in the range of from 7.1–7.8 and is prepared by hydrolyzing an alkyltrialkoxysilane or aryltrialkoxysilane in an aqueous colloidal silica dispersion. A thickening agent and an ultraviolet light screening agent are added to the resultant hydrolysis product.

14 Claims, No Drawings ated Application

This is a divisional of application Ser. No. 364,302 filed Apr. 1, 1982 and now U.S. Pat. No. 4,436,851, which is a continuation-in-part of copending U.S. application Ser. No. 964,910, filed Nov. 30, 1978, now abandoned.

BACKGROUND OF THE INVENTION

This invention relates to a protective coating composition. More particularly, it relates to a silicone resin coating composition which, when applied to a solid substrate, forms a protective, abrasion-resistant coating thereon.

Recently, the substitution of glass glazing with transparent materials which do not shatter or are more resistant to shattering than glass has become widespread. For example, transparent glazing made from synthetic organic polymers is now utilized in public transportation vehicles, such as trains, buses, taxis and airplanes. Lenses, such as for eye glasses and other optical instruments, as well as glazing for large buildings, also employ shatter-resistant, transparent plastics. The lighter weight of these plastics in comparison to glass is another advantage, especially in the transportation industry where the weight of the vehicle is a major factor in its fuel economy.

While transparent plastics provide the major advantages of being more resistant to shattering and lighter than glass, a serious drawback lies in the ease with which these plastics mar and scratch due to everyday contact with abrasives, such as dust, cleaning equipment and ordinary weathering. Continuous scratching and marring results in impaired visibility and poor aesthetics, and oftentimes requires replacement of the glazing or lens or the like.

One of the most promising and widely used transparent plastics for glazing is polycarbonate, such as that known as Lexan ®, sold by General Electric Company. It is a tough material, having high impact strength, high heat deflection temperature, and good dimensional stability. It is also self-extinguishing and is easily fabricated. Acrylics, such as polymethylmethacrylate, are also widely used transparent plastics for glazing.

Attempts have been made to improve the abrasion-resistance of transparent plastics. For example, scratch-resistant coatings formed from mixtures of silica, such as colloidal silica or silica gel, and hydrolyzable silanes in a hydrolysis medium, such as alcohol and water, are known. U.S. Pat. Nos. 3,708,225 (Misch et al.); 3,976,497 (Clark); 3,986,997 (Clark); 4,027,073 (Clark); 4,159,206 (Armbruster et al.) and 4,177,315 (Ubersax), for example, describe such compositions.

Improved such compositions are disclosed in U.S. application Ser. No. 964,901, filed Nov. 30, 1978, now abandoned and U.S. Pat. No. 4,309,319. In the former, it was discovered that, in direct contrast to the teachings of U.S. Pat. No. 3,986,997, compositions having a basic pH, i.e., 7.1–7.8, do not immediately gel but in fact provide excellent abrasion-resistant coatings on solid substrates. In the latter it was disclosed that the abrasion-resistance of silicone coating compositions is improved if a thickening agent is added to the composition.

In recent months, it has become desirable to improve the "weatherability", that is, the resistance to discoloration and breakdown due to exposure to ultraviolet (UV) radiation and moisture, offered by the coating compositions of U.S. application Ser. No. 964,910, now abandoned. Moreover, in view of the usefulness of these compositions in coating plastic substrates, improving the adhesion of silicone resin compositions to plastic and other materials is also desirable.

It has been discovered that such silicone coatings, especially if acidic, fail to adhere to certain plastic substrates, such as polycarbonate, and, even if prepared on the basic side of neutrality, they may adhere initially but peel after brief light aging. In U.S. Pat. No. 4,299,746, the addition of an ultraviolet light absorbing agent is suggested, but in some cases this may have a plasticizing effect, and polycarbonate seems to have a tendency to reject the coating on severe exposure. Another approach is to use a primer coat which adheres to both the silicone resin coating and the polycarbonate substrate, and which also serves as a binder for high levels of UV absorbers. The silicone resin coating is put on as a second coat over the primer coat. See, for example, Humphrey, Jr., U.S. Pat. No. 4,188,451. A further development, disclosed in commonly assigned, copending U.S. application Ser. No. 327,448, filed Dec. 4, 1981, is the employment of UV-absorbing compounds in the primer coat to give added weatherability to coated substrates.

It has now been discovered that a uniquely serviceable coating composition having a combination of properties including abrasion resistance, weatherability and compatibility with conventional as well as UV-absorber-modified primer solutions is obtained by adding both a thickening agent and an ultraviolet light absorbing compound to the silicone resin compositions of U.S. application Ser. No. 964,910, now abandoned.

SUMMARY OF THE INVENTION

Accordingly, it is one object of the present invention to provide a novel protective silicone resin coating for solid substrates.

Another object of this invention is to provide a coating composition for solid substrates with improved abrasion-resistance and weatherability.

Still another object of the present invention is to provide a silicone resin coating composition which is compatible for use with different types of adhesion-promoting primers.

Still another object of the present invention is to provide a silicone resin coating composition, especially well suited for providing an improved abrasion-resistant surface coating to transparent substrates without impairing the optical clarity of the substrates.

These and other objects are accomplished herein by a coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids, said solids consisting essentially of 10 to 70 weight percent colloidal silica and 30 to 90 weight percent of the partial condensate, said composition further containing a thickening agent and an ultraviolet light absorbing agent, said composition having a pH of from 7.1 to about 7.8.

DETAILED DESCRIPTION OF THE INVENTION

The coating compositions of this invention are prepared by hydrolyzing a trialkoxysilane or a mixture of trialkoxysilanes of the formula R'Si(OR)$_3$, is alkyl of from 1 to 3 carbons or aryl, such as phenyl, and R is alkyl, in an aqueous dispersion of colloidal silica to form a resinous composition, to which is added a thickening agent and an ultraviolet light screening agent.

In the practice of the present invention, suitable aqueous colloidal silica dispersions generally have a particle size of from 5 to 150 millimicrons in diameter. These silica dispersions are well known in the art and are available commercially under the trademarks of Ludox ® (duPont) and Nalcoag ® (NALCO Chemical Co.). Such colloidal silicas are available as both acidic and basic hydrosols. For the purpose of this invention, wherein the pH of the coating compositions is on the basic side, basic colloidal silica sols are preferred. However, acidic colloidal silicas, wherein the pH is adjusted to a basic level, are also contemplated. In addition, it has been found that colloidal silicas having a low alkali content (e.g., Na$_2$O) yield a more stable coating composition. Thus, colloidal silicas having an alkali content of less than 0.35% (calculated as Na$_2$O) have been found to be preferable. Moreover, colloidal silicas having an average particle size of from 10 to 30 millimicrons are also preferred. A particularly preferred aqueous colloidal silica dispersion for the purposes herein is known as Ludox LS ®, sold by duPont Company.

In accordance with this invention, the aqueous colloidal silica dispersion is added to a solution of a small amount of glacial acetic acid in alkyltrialkoxysilane or aryltrialkoxysilane. For the purposes herein, from about 0.05 parts by weight, to about 0.08 parts by weight, based on 100 parts by weight of the total composition of the glacial acetic acid is used. Alternatively, about 0.06 to about 0.1 parts by weight of an alkyltriacetoxysilane, such as methyltriacetoxysilane, can be used instead of glacial acetic acid. Glacial acetic acid is preferred. The temperature of the reaction mixture is maintained at about 20° C. to about 40° C., preferably 20° C. to about 30° C., and most preferably below 25° C.

It has been found that in about six to eight hours sufficient trialkoxysilane has hydrolyzed so as to reduce the initial two-phase liquid mixture to one liquid phase in which the now treated silica (i.e., treated by its admixture with the alkyltrialkoxysilane or aryltrialkoxysilane) is dispersed. In general, the hydrolysis reaction is allowed to continue for a total of about 12 to 48 hours, depending upon the desired viscosity of the final product. The more time the hydrolysis reaction is permitted to continue, the higher will be the viscosity of the product.

After the hydrolysis has been completed to the desired extent, the solids content is adjusted by the addition of alcohol, or combinations of alcohols, to the reaction mixture. The use of a mixture of isopropanol, isobutanol and diacetone alcohol herein has been found to provide the best performance without diminishing the optical clarity of the compositions. Other alcohols, however, are suitable for adjusting the solids contents, especially if excellent optical clarity is not a prime concern. Other alcohols which are suitable dilution solvents include lower aliphatic alcohols, such as methanol, ethanol, propanol, isopropanol, isobutanol, n-butyl alcohol and t-butyl alcohol. Mixtures of such alcohols can be used as well. The solvent system should contain from about 20 to 75 weight percent alcohol to ensure solubility of the partial condensate (siloxanol). Optionally, additional water-miscible polar solvents, such as acetone, diacetone alcohol, butyl Cellosolve and the like in minor amounts, no more than 20 weight percent of the co-solvent system, can also be used. The solids content of the coating composition of this invention is generally preferred to be in the range of from about 10% to 25%, most preferably about 13% to about 20%, by weight of the total composition. The most preferred dilution solvent is a mixture of isopropanol, isobutanol and diacetone alcohol.

In order to provide the improved abrasion-resistance desired herein, a thickening agent is added to the resin composition. The thickening agent may be added either during hydrolysis or after dilution with alcohol as described hereinabove. The addition of the thickening agent results in a higher viscosity fluid resin which permits a thicker wet film to be deposited on the substrate which in turn results in a thicker cured film having increased abrasion resistance. Surprisingly, increasing the viscosity of the coating resins herein by the addition of a thickening agent does not result in a shortened shelf life of the composition as was found to occur when the viscosity was increased by simply raising the solids content of the composition.

Thickening agents suitable for the purposes herein include hydroxypropyl guar gum and hydroxypropyl cellulose. Amounts contemplated are about 0.1 to about 1.0 weight percent, preferably about 0.1 to about 0.5 weight percent, of the total composition.

The pH of the resultant coating compositions of the invention is in the range of from about 7.1 to about 7.8, preferably higher than 7.2, such as from 7.3 to about 7.5. If necessary, dilute base, such as ammonium hydroxide, or weak acid, such as acetic acid, can be added to the composition to adjust the final pH to this desired range. At these basic pH's, the compositions are translucent liquids which are stable at room temperature for at least several weeks. When stored at temperatures below about 5° C. (40° F.) the period of stability is increased even further.

The glacial acetic acid is used to buffer the basicity of the initial two liquid phase reaction mixtures and thereby also temper the hydrolysis rate. While the use of glacial acetic acid is most preferred herein, other acids may be used in its place, such as organic acids like propionic, butyric, citric, benzoic, formic, oxalic and the like. Alkyltriacetoxysilanes wherein the alkyl group contains from 1 to 6 carbon atoms can be used, methyltriacetoxysilane being preferred.

The silanetriols, RSi(OH)$_3$, hereinbefore mentioned, are formed in situ as a result of the admixture of the corresponding trialkoxysilanes with the aqueous medium, i.e., the aqueous dispersion of colloidal silica. Exemplary trialkoxysilanes are those containing methoxy, ethoxy, isopropoxy and n-butoxy substituents which, upon hydrolysis, generate the silanetriol and further liberate the corresponding alcohol. In this way, at least a portion of the alcohol content present in the final coating composition is provided. Of course, if a mixture of trialkoxysilanes is employed, as provided for hereinabove, a mixture of different silanetriols, as well as different alcohols, is generated. Upon the generation of the silanetriol or mixtures of silanetriols in the basic aqueous medium, condensation of the hydroxyl substituents to form

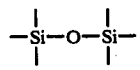

bonding occurs. This condensation takes place over a period of time and is not an exhaustive condensation; rather the siloxane retains an appreciable quantity of silicon-bonded hydroxyl groups which render the polymer soluble in the alcohol-water cosolvent. This soluble partial condensate can be characterized as a siloxanol polymer having at least one silicon-bonded hydroxyl group per every three

units.

The non-volatile solids portion of the coating composition herein is a mixture of colloidal silica and the partial condensate (or siloxanol) of a silanol. The major portion or all of the partial condensate of siloxanol is obtained from the condensation of $CH_3Si(OH)_3$ and, depending upon the input of ingredients to the hydrolysis reaction, minor portions of partial condensate can be obtained, for example, from the condensation of $CH_3Si(OH)_3$ with $C_2H_5Si(OH)_3$ or $C_3H_7Si(OH)_3$; $CH_3Si(OH)_3$ with $C_6H_5Si(OH)_3$, or even mixtures of the foregoing. For optimum results in the cured coating it is preferred to use all methyltrimethoxysilane (thus generating all monomethylsilanetriol) in preparing the coating compositions herein. In the preferred coating compositions herein the partial condensate is present in an amount of from about 55 to 75 weight percent of the total solids in a cosolvent of alcohol and water, the alcohol comprising from about 50 to 90 weight percent of the cosolvent.

At low solids contents, such as about 13%, it has been found that the polysiloxane polyether copolymers disclosed in U.S. Pat. No. 4,277,287 (Frye), incorporated herein by reference, may be employed in the thickened compositions of this invention as flow control additives which assist in the prevention of flowmarks, dirtmarks and the like on the surface of the substrate which is coated. Generally, these polysiloxane polyether copolymers may be employed in amounts of from about 1.0 to about 5.0 weight percent of the total solids of the composition. Most advantageous results may be achieved when the copolymer is utilized at about 1.6 weight percent of the total solids. At these amounts, the polysiloxane polyether copolymer prevents marks on the substrate which impair visibility or are aesthetically detracting and has no significant deleterious effects on the otherwise good abrasion resistance, scribed adhesion, ultraviolet light resistance, moisture and humidity resistance of the coating. Moreover, the presence of the polysiloxane polyether copolymer additive is found to reduce the incidence of stress cracking in the hard coating.

Although the polysiloxane polyether copolymer slightly raises the viscosity of the coating composition, it does not accelerate the rate of viscosity increase with age of the composition, nor does it shorten the shelf-life of the composition. The polysiloxane polyether copolymer is completely compatible with the alcohol-water cosolvent system of the compositions herein and becomes a permanent part of the cured coating, not removed by washing, even with soap and water.

More specifically, some of the polysiloxane polyether copolymers which may be used in the practice of the invention herein are liquid organopolysiloxane copolymers having the formula:

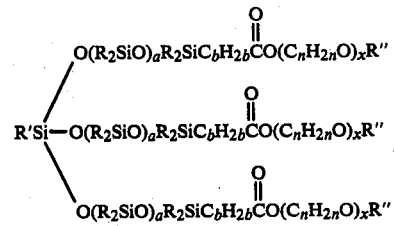

where R and R' are monovalent hydrocarbon radicals; R" is a lower alkyl radical; a has a value of at least 2, e.g., from about 2 to 40 or more; b has a value of from 2 to 3, n has a value of from 2 to 4 and x has a value of at least 5, e.g., from 5 to 100 or more.

Among the radicals represented by R and R' in the above formula can be mentioned, for example, alkyl radicals, e.g., methyl, ethyl, propyl, butyl, octyl, etc.; cycloalkyl radicals, e.g., cyclohexyl, cycloheptyl, etc.; aryl radicals, e.g., phenyl, tolyl, naphthyl, xylyl, etc.; aralkyl, e.g., benzyl, phenylethyl, etc., alkenyl and cycloalkenyl, e.g., vinyl, allyl, cyclohexenyl, etc.; and halogenated radicals of the aforementioned type, e.g., chloromethyl, chlorophenyl, dibromophenyl, etc. R" is lower alkyl, e.g., an alkyl radical containing from 1 to about 7 carbon atoms, such as methyl, ethyl, propyl, butyl, isobutyl, amyl, etc. The preparation and description of these polysiloxane polyether copolymers is disclosed in U.S. Pat. No. 3,629,165, which is incorporated herein by reference. In the above formula R is preferably methyl, R' is preferably methyl, R" is preferably butyl, a is preferably 4, b is preferably 3, n is preferably 2.4, and x is preferably 28.5. Particularly suitable polysiloxane polyether copolymers for the purpose of this invention include the materials known as SF-1066 and SF-1141, made by General Electric Company; BYK-300, sold by Mallinckrodt; L-540, L-538, sold by Union Carbide; and DC-190, sold by Dow Corning.

The ultraviolet light absorbing compounds used in accordance with the present invention must be soluble in, and otherwise compatible with, the silicone resin hydrolyzate. A particularly preferred compound is 2,4-dihydroxybenzophenone, known commercially as Uvinul 400 ®, sold by GAF. This compound is fully soluble in the silicone resin hydrolyzate, and furthermore is particularly effective in protecting polycarbonate from discoloration when the present coating compositions are applied to the surface thereof. Moreover, the presence of the 2,4-dihydroxybenzophenone does not detract from the otherwise excellent abrasion-resistance, moisture resistance, adhesion, shelf-life and optical clarity afforded by the silicone resin hydrolyzate.

Other substituted hydroxybenzophenone ultraviolet light absorbers which have been found to be soluble in the silicone resin hydrolyzate and which prevent discoloration of the substrate are 2-hydroxy-4-methoxy benzophenone and 2,2'-dihydroxy-4-methoxybenzophenone.

Any amount of ultraviolet light absorber which is effective to prevent discoloration of the substrate to which the composition will be applied can be used herein. In general, it has been found that best results are obtained if the ultraviolet light absorber is employed in amounts of from 3-5 weight percent of the total solids of the coating composition.

It has been found that a particularly excellent coating composition is obtained if, after thoroughly admixing the ultraviolet light absorber with the resin hydrolyzate, the total admixture is allowed to age before use. By aging, it is meant standing at room temperature from about 5 to 10 days. While the nature of aging process with respect to the compositions of this invention is not fully understood, it is believed that the ultraviolet light absorber is actually being incorporated into the structure of the hydrolyzate resin, perhaps by transesterification. In any event, it has been found that if the compositions of this invention are not aged after the addition of the ultraviolet light absorber inferior adhesion of the coating to the substrate and poorer abrasion resistance may result.

The coating compositions of this invention will cure on a substrate at temperatures of, for example, 120° C. without the aid of an added curing catalyst. However, in order to employ more desirable milder curing conditions, buffered latent condensation catalysts can be added. Included in this class of catalysts are alkali metal salts of carboxylic acids, such as sodium acetate, potassium formate and the like. Amine carboxylates, such as dimethylamine acetate, ethanolamine acetate, dimethylaniline formate and the like, quaternary ammonium carboxylates such as tetramethlyammonium acetate, benzyltrimethylammonium acetate, metal carboxylates, like tin octoate and amines such as triethylamine, triethanolamine, pyridine and the like are also contemplated curing catalysts herein. Alkali hydroxides, like sodium hydroxide and ammonium hydroxide can also be used as curing catalysts herein. Moreover, typical commercially available colloidal silica, especially those having a basic pH, contain free alkali metal base and alkali metal carboxylate catalysts will be generated in situ during the hydrolysis reaction herein.

The amount of curing catalyst can be varied within a wide range, depending upon the desired curing conditions. However, in general, catalyst in the amounts of from about 0.05 to about 0.5 weight percent, preferably about 0.1 weight percent, of the composition can be used. Compositions containing catalysts in these amounts can be cured on a solid substrate in a relatively short time at temperatures in the range of from about 75° C.–150° C. to provide a transparent abrasion-resistant surface coating.

The coating compositions of the present invention can be applied to a variety of solid substrates by conventional methods, such as flowing, spraying or dipping, to form a continuous surface film. Optimum coating thicknesses are obtained by slow dip coating procedures. Substrates which are especially contemplated herein are transparent, as well as non-transparent, plastics and metals. More particularly, these plastics are synthetic organic polymeric substrates such as acrylic polymers like poly(methylmethacrylate), polyesters, such as poly(ethylene terephthalate), poly(butylene terephthalate), etc., polyamides, polyimides, acrylonitrile-styrene copolymers, styrene-acrylonitrile-butadiene copolymers, polyvinyl chloride, butyrates, polyethylene and the like. The coating compositions of this invention are especially useful as coatings for polycarbonates, such as those polycarbonates known as Lexan ®, sold by General Electric Company and as coatings for injection molded or extruded acrylics, such as polymethylmethacrylates. Metal substrates on which the present protective coatings are also effective include bright and dull metals like aluminum and bright metallized surfaces like sputtered chromium alloy. Other solid substrates contemplated herein include wood, painted surfaces, leather, glass, ceramics and textiles.

By choice of the proper formulation, application conditions and pretreatment, including the use of primers, of the substrate, the coatings can be adhered to substantially all solid substrates. A hard coating having all of the aforementioned characteristics and advantages is obtained by the removal of the solvent and volatile materials. The coating composition will air-dry to a tack-free condition, but heating in the range of 75° C. to 200° C. is necessary to obtain condensation of residual silanols in the partial condensate. This final cure results in the formation of silsesquioxane ($RSiO_{3/2}$). In the finished cured coating the ratio of $RSiO_{3/2}$ units to $SiO_2$ will range from about 0.43 to about 9.0, preferably 1 to 3. A cured coating having a ratio of $RSiO_{3/2}$ to $SiO_2$, where R is methyl, of 2 is most preferred. Coating thicknesses may vary but for the improved abrasion resistance desired herein, coating thicknesses of 3–10 microns, preferably 5 microns, are utilized.

In order that those skilled in the art may better understand how to practice the present invention, the following examples are given by way of illustration and not by way of limitation.

EXAMPLES 1-3

20.0 parts by weight of Ludox LS ® (aqueous colloidal silica dipsersion, average particle size of 12 millimicrons, pH 8.2 sold by duPont) is added, over a period of one-half hour, to a solution of 0.04 parts by weight glacial acetic acid in 24.4 parts by weight of methyltrimethoxysilane. The temperature of the reaction mixture is maintained between 20° C. and 30° C. The hydrolysis is allowed to proceed over a period of sixteen hours. At this time the reaction mixture is diluted with a solvent mixture of 10.4 parts by weight isopropanol, 9.9 parts by weight diacetone alcohol and 19.3 parts by weight isobutanol. 15.6 parts by weight of a hydroxy-propyl cellulose concentrate (1% Klucel H ®, sold by Hercules, in a 5% aqueous isopropanol solution) are added finally.

1585 g of this composition are removed and 12.7 g of 2,4-dihydroxybenzophenone are added to form a coating composition which is then divided into three portions and designated A, B and C.

Coating A is coated on an unprimed Lexan ® plaque and cured 1 hour at 120° C. Coating adhesion is tested by the scribed adhesion method, whereby a criss-cross pattern is scribed on the coated surface and 3M 710 tape applied and pulled away. Three tape pulls without removal of any of the coating is passing.

Abrasion resistance is also tested using a Taber Abraser. The percent increase in haze ($\Delta\%H$) is measured after 500 revolutions of CS-10F abrasive wheels under a 500-gram load are applied to the coated surface.

Coating A does not pass even unscribed adhesion testing and shows a $\Delta\%H$ of 33.8.

Coating B is applied to a Lexan ® plaque primed with a 2% solution of polymethylmethacrylate in an 80:20 mixture of 2-ethoxyethanol and diacetone alcohol.

The coating is cured 1 hour at 120° C. It passes scribed adhesion and shows a Δ%H of 11.8.

Coating C is applied to a Lexan ® plaque primed with a composition prepared according to the disclosure in commonly assigned, copending U.S. application Ser. No. 327,448, filed Dec. 4, 1981, which is incorporated herein by reference. The primer composition comprises a solution of 4% polymethylmethacrylate dissolved in a 4:1 solution of ethylene glycol monoethyl ether and diacetone alcohol also containing 0.8 parts by weight of a cyanoacrylate UV screen (Uvinul N-539 ®, GAF Corp.) and 0.2 parts by weight of a hindered amine antioxidant (Tinuvin 144 ®, Ciba-Geigy).

Coating C is cured 1 hour at 120° C. The coating passes scribed adhesion and shows a Δ%H of 8.15. This coating, which was coated nine days after Coating B, shows the beneficial effects of aging (described supra) on performance.

By following the teachings of this invention, a variety of useful, tough and optically clear coatings can be made. Obviously, other modifications and variations of the present invention are possible in light of the foregoing disclosure. It is understood, however, that changes which may be made in the particular embodiments of this invention are within the full intended scope of the invention as defined by the appended claims.

I claim:

1. An article comprising a solid substrate having at least one surface coated with an aqueous coating composition comprising a dispersion of colloidal silica in an aliphatic alcohol-water solution of the partial condensate of a silanol of the formula $RSi(OH)_3$, wherein R is selected from the group consisting of alkyl having from 1 to 3 carbon atoms and aryl, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, the composition further containing from about 0.1 to about 1.0 weight percent of a thickening agent selected from the group consisting of hydroxypropyl guar gum and hydroxypropyl cellulose and a small amount effective to prevent discoloration of the substrate of an ultraviolet light absorbing agent which is soluble in the coating composition, said composition having a pH of about 7.1 to about 7.8.

2. An article as defined in claim 1, wherein the solid substrate is comprised of a synthetic organic polymer.

3. An article as defined in claim 2, wherein said polymer is a transparent polymer.

4. An article as defined in claim 3, wherein said polymer is a polycarbonate.

5. An article as defined in claim 4, wherein said polycarbonate is transparent.

6. An article as defined in claim 4, wherein said polycarbonate is a poly(bisphenol-A carbonate).

7. An article as defined in claim 2, wherein said polymer is a polymethylmethacrylate.

8. An article as defined in claim 7, wherein said polymethylmethacrylate is transparent.

9. An article as defined in claim 1, wherein the aqueous coating composition has been cured on said surface of said solid substrate.

10. An article as defined in claim 1 wherein said surface of said solid substrate has been primed with a primer composition prior to having been coated with said aqueous coating composition.

11. An article as defined in claim 10, wherein said primer composition is comprised of a thermosetting acrylic emulsion.

12. An article as defined in claim 10, wherein said primer composition is comprised of a 2% solution of polymethylmethacrylate in an 80:20 mixture of 2-ethoxyethanol and diacetone alcohol.

13. An article as defined in claim 10, wherein said primer composition comprises a solution of about 4% polymethylmethacrylate dissolved in a mixture of an ether solvent and a ketone solvent containing an ultraviolet light absorbing compound, or a combination of an ultraviolet light absorbing compound and an ultraviolet radiation stabilizing agent.

14. An article as defined in claim 13, wherein said ultraviolet light absorbing compound is 2-ethylhexyl ester of 3,3 diphenyl 2 cyanoacrylate.

* * * * *